(12) United States Patent
Ansah et al.

(10) Patent No.: US 10,897,415 B2
(45) Date of Patent: Jan. 19, 2021

(54) METHOD AND APPARATUS FOR CONFIGURING A NETWORK AND COMMUNICATION NETWORK

(71) Applicant: Siemens Aktiengesellschaft, Munich (DE)

(72) Inventors: Frimpong Ansah, Munich (DE); Mohamed El Amine Houyou, Jersey City, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/753,460

(22) PCT Filed: Oct. 5, 2017

(86) PCT No.: PCT/EP2017/075340
§ 371 (c)(1),
(2) Date: Apr. 3, 2020

(87) PCT Pub. No.: WO2019/068329
PCT Pub. Date: Apr. 11, 2019

(65) Prior Publication Data
US 2020/0322245 A1   Oct. 8, 2020

(51) Int. Cl.
*G06F 15/173* (2006.01)
*H04L 12/26* (2006.01)
*H04L 12/24* (2006.01)

(52) U.S. Cl.
CPC ...... *H04L 43/0852* (2013.01); *H04L 41/0806* (2013.01); *H04L 43/16* (2013.01); *H04L 43/50* (2013.01)

(58) Field of Classification Search
CPC ............. H04L 43/0829; H04L 43/0852; H04L 43/106; H04L 43/16; H04L 43/50
(Continued)

(56) References Cited

U.S. PATENT DOCUMENTS

| 6,590,869 B1* | 7/2003 | Beyda ................ H04M 7/0057 370/248 |
| 2005/0058083 A1* | 3/2005 | Rogers .................. H04L 47/10 370/252 |

(Continued)

OTHER PUBLICATIONS

Search Report and Written Opinion of International Searching Authority for International Application No. PCT/EP2017/075340. 12 pages, dated Nov. 30, 2017.

(Continued)

*Primary Examiner* — Liang Che A Wang
(74) *Attorney, Agent, or Firm* — Slayden Grubert Beard PLLC

(57) ABSTRACT

Some embodiments include a method for configuring a network comprising a plurality of transmitters and a plurality of receivers. Each transmitter periodically transmits a predetermined amount of data to an associated receiver with a respective individual predetermined transmission period for each transmitter. There is a predetermined transmission path between each respective transmitter and the associated receiver. The method may include: computing, for each transmission within a predetermined test period, a maximum amount of delay between transmission of data by a transmitter and a reception by the associated receiver; determining, for each transmission whether the computed amount of delay exceeds a predetermined first threshold value; and using the predetermined transmission path only if a number of the computed amounts of delay which exceeds the predetermined first threshold value within the predetermined test period is equal or less than a second predetermined threshold value.

15 Claims, 2 Drawing Sheets

(58) Field of Classification Search
USPC .................................... 709/220, 223, 224
See application file for complete search history.

(56) References Cited

U.S. PATENT DOCUMENTS

| | | | | |
|---|---|---|---|---|
| 2005/0086362 A1* | 4/2005 | Rogers | ................... | H04L 47/28 |
| | | | | 709/235 |
| 2007/0071026 A1* | 3/2007 | Rogers | ................ | H04N 21/238 |
| | | | | 370/458 |
| 2008/0113636 A1* | 5/2008 | Kikuchi | ........... | H04W 56/0045 |
| | | | | 455/130 |
| 2008/0298444 A1* | 12/2008 | Cioffi | .................. | H04M 11/062 |
| | | | | 375/222 |
| 2009/0059958 A1* | 3/2009 | Nakata | ................ | H04W 28/06 |
| | | | | 370/474 |
| 2010/0002796 A1* | 1/2010 | Zhang | ................ | H04L 27/2607 |
| | | | | 375/267 |
| 2016/0218979 A1* | 7/2016 | Roh | ....................... | H04L 43/16 |

OTHER PUBLICATIONS

Notification of Transmittal of the International Preliminary Report on Patentability. 18 pages, dated Oct. 4, 2019.

* cited by examiner

METHOD AND APPARATUS FOR CONFIGURING A NETWORK AND COMMUNICATION NETWORK

CROSS-REFERENCE TO RELATED APPLICATIONS

This application is a U.S. National Stage Application of International Application No. PCT/EP2017/075340 filed Oct. 5, 2017, the contents of which are hereby incorporated by reference in their entirety.

TECHNICAL FIELD

The present disclosure relates to network management. Various embodiments may include methods and/or apparati for configuring a network as well as communication networks.

BACKGROUND

Some networks include an automated system employing applications that require update between a master controller and peripheral devices in an industrial environment. Automated systems, in particular automated systems of an industrial application, may employ controller-centered applications that require a periodic update between a master controller and several peripheral devices. It is for this purpose that data are sent periodically from each of the peripheral devices to a corresponding master controller. A variety of technologies such as industrial Ethernet or industrial bus systems may be used for transferring the data between the peripheral devices and the controller. For instance, a device such as a robot arm may periodically report its status, e.g. the position of the robot arm, to a controller, and the controller may compute further control instructions based on the received data.

In order to enable a reliable control of such applications, the controller has to receive the data from the peripheral devices regularly and without undue delay. Hence, when designing a new system or when expanding an existing system, it has to be ensured that the requirements for a timely and reliable transmission of data between peripheral devices and the controller are guaranteed.

SUMMARY

Against this background, the teachings of the present disclosure include configurations for a network enabling a timely and reliable transmission of data in a network in which data are periodically transmitted. For example, some embodiments include a method for configuring a network (10), the network (10) comprising a first number of transmitters (1-$i$) and a second number of receivers (2-$i$), wherein each transmitter (1-$i$) of the first number of transmitters (1-$i$) periodically transmits a predetermined amount of data to an associated receiver (2-$i$) of the second number of receivers (2-$i$), the periodical transmission is performed with an individual predetermined transmission period for each of the transmitters (1-$i$), and a predetermined transmission path is used between each of the transmitters (1-$i$) and the associated receiver (2-$i$), the method comprising: computing (S1), for each transmission of the transmitters (1-$i$) within a predetermined test period, a maximum amount of delay between a transmission of data by a transmitter (1-$i$) and a reception of the data by the associated receiver (2-$i$); determining (S2), for each transmission of the transmitters (1-$i$) within the predetermined test period, whether the computed amount of delay exceeds a predetermined first threshold value; and applying (S3) the predetermined transmission path, if a number of the computed amounts of delay which exceeds the predetermined first threshold value within the predetermined test period is equal or less than a second predetermined threshold value.

In some embodiments, the test period is computed based on a least common multiple of the transmission periods of the transmitters (1-$i$).

In some embodiments, the maximum amount of delay is computed for each time slot when the transmission of data by at least two transmitters (1-$i$) is overlapping.

In some embodiments, the maximum amount of delay is computed based on the a sum of the amount of data transmitted at the respective time slot.

In some embodiments, the method also includes adapting at least one transmission path, if the number of the computed amounts of delay which exceeds the predetermined first threshold value within the predetermined test period is greater than the second predetermined threshold value.

In some embodiments, the method also includes applying a time division multiplex transmission between at least one transmitter (1-$i$) and the associated receiver (2-$i$) if the number of the computed amounts of delay which exceeds the predetermined first threshold value within the predetermined test period is greater than the second predetermined threshold value.

In some embodiments, data from at least two transmitters (1-$i$) are handled by a common port of a network device (3-$i$) in the transmission paths between each of the transmitters (1-$i$) and the associated receivers (2-$i$).

In some embodiments, the method also includes adding a further transmitter (1-$i$) to the network (10), wherein the further transmitter (1-$i$) is adapted to periodically transmits a predetermined amount of data to an associated receiver (2-$i$) of the network (10).

As another example, some embodiments include a network controlling apparatus (4) for configuring a network (10), the network (10) comprising a first number of transmitters (1-$i$) and a second number of receivers (2-$i$), wherein each transmitter (1-$i$) of the first number of transmitters (1-$i$) periodically transmits a predetermined amount of data to an associated receiver (2-$i$) of the second number of receivers (2-$i$), the periodical transmission is performed with an individual predetermined transmission period for each of the transmitters (1-$i$), and a predetermined transmission path is used between each of the transmitters (1-$i$) and the associated receiver (2-$i$), the apparatus (4) comprising: a delay calculator (41) adapted to compute, for each transmission of the transmitters (1-$i$) within a predetermined test period, a maximum amount of delay between a transmission of data by a transmitter (1-$i$) and a reception of the data by the associated receiver (2-$i$); a comparator (42) adapted to determine, for each transmission of the transmitters (1-$i$) within the predetermined test period, whether the computed amount of delay exceeds a predetermined first threshold value; and a network configurator (43) adapted to apply the predetermined transmission path, if a number of the computed amounts of delay which exceeds the predetermined first threshold value within the predetermined test period is equal or less than a second predetermined threshold value.

In some embodiments, the delay calculator is adapted to compute the test period based on a least common multiple of the transmission periods of the transmitters.

In some embodiments, the network configurator (43) is adapted to apply a time division multiplex transmission between at least one transmitter (1-i) and the associated receiver (2-i) if the number of the computed amounts of delay which exceeds the predetermined first threshold value within the predetermined test period is greater than the second predetermined threshold value.

In some embodiments, data from at least two transmitters (1-i) are handled by a common port of a network device (3-i) in the transmission paths between each of the transmitters (1-i) and the associated receivers (2-i).

In some embodiments, the network configurator (43) is adapted to add a further transmitter (1-i) to the network (10), the further transmitter (1-i) is adapted to periodically transmit a predetermined amount of data to an associated receiver (2-i) of the network (10).

As another example, some embodiments include a communication network (10), comprising: a first number of transmitters (1-i); a second number of receivers (2-i); and a network infrastructure adapted to communicatively couple the first number of transmitters (1-i) and the second number of receivers (2-i); wherein each transmitter (1-i) of the first number of transmitters (1-i) is adapted to periodically transmit a predetermined amount of data to an associated receiver of the second number of receivers (2-i), the periodical transmission is performed with an individual predetermined transmission period for each of the transmitters (1-i), and a predetermined transmission path through the network infrastructure is used between each of the transmitters (1-i) and the associated receiver (2-i); and a network controlling apparatus (4) as described above.

In some embodiments, the network infrastructure comprises packet switched network.

BRIEF DESCRIPTION OF THE DRAWINGS

For a more complete understanding of the teachings of the present disclosure and advantages thereof, reference is now made to the following description taken in conjunction with the accompanying drawings. The description below uses exemplary embodiments which are specified in the schematic figures of the drawings, in which.

Figure 1:
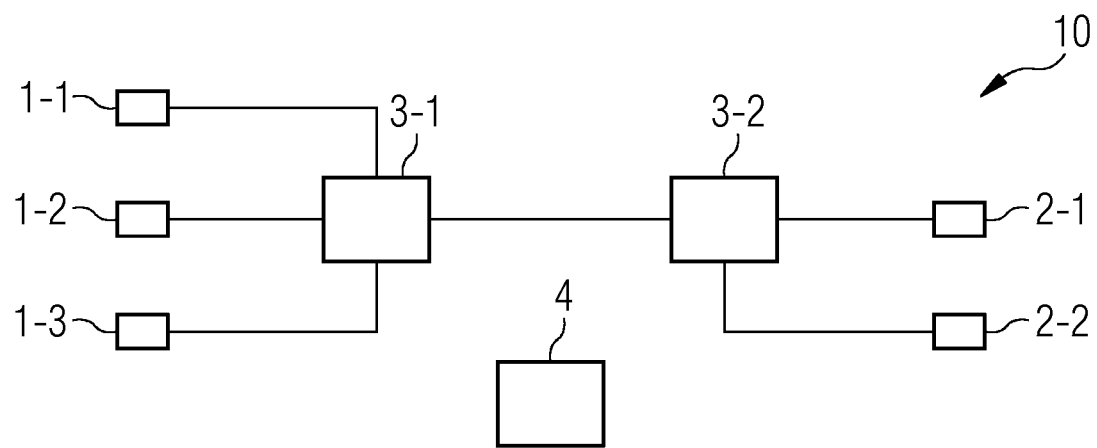
FIG. 1 shows a block diagram of an embodiment of a communication network incorporating teachings of the present disclosure.

The appended drawings are intended to provide a further understanding of the teachings of the invention. The illustrated embodiments in conjunction with the description help to explain principles and concepts of the teachings herein. Also embodiments and many of the advantages mentioned became apparent in view of the drawings. In the drawings, like, functional, equivalent and identical operation elements, features and components are provided with like reference signs in each case, unless stated otherwise.

DETAILED DESCRIPTION

Some embodiments of the teachings herein include a method for configuring a network. The network comprises a first plurality of transmitters and a second plurality of receivers. Each transmitter of the first plurality of transmitters periodically transmits a predetermined amount of data to an associated receiver of the second plurality of receivers. In particular, the predetermined amount of data which is transmitted by each of the transmitters may be different. The periodical transmission is performed with an individual predetermined transmission period for each of the transmitters. A predetermined transmission path is used between each of the transmitters and the respective associated receiver. The method comprises a step of computing, for each transmission of the transmitters within a predetermined test period, a maximum amount of a delay between a transmission of data by a receiver and a reception of the data by the respective associate receiver. The method comprises further a step of determining, for each transmission of the transmitters within the predetermined test period, whether or not the computed amount of delay exceeds a predetermined first threshold value. Further, the method comprises a step of applying the predetermined transmission path, if a number of the computed amount of delay which exceeds the predetermined first threshold value within the predetermined test period is equal or less than a second predetermined threshold value.

Some embodiments include a network controlling apparatus for configuring a network. The network comprises a first number of transmitters and a second number of receivers. Each transmitter of the first number of transmitters periodically transmits a predetermined amount of data to an associated receiver of the second number of receivers. The periodical transmission is performed with an individual predetermined transmission period for each of the transmitters. A predetermined transmission path is used between each of the transmitters and the respective associated receiver. The apparatus comprises a delay calculator, a comparator, and a network configurator. The delay calculator is configured to compute, for each transmission of the transmitters within a predetermined test period, a maximum amount of delay between a transmission of data by a transmitter and a reception of the data by the associated receiver. The comparator is configured to determine, for each transmission of the transmitters within the predetermined test period, whether or not the computed amount of a delay exceeds a predetermined first threshold value. The network configurator is adapted to apply the predetermined transmission path, if a number of the computed amounts of delay which exceeds the predetermined first threshold value within the predetermined test period is equal or less than a second predetermined threshold value.

Some embodiments include a communication network. The communication network comprises a first number of transmitters, a second number of receivers, a network infrastructure and a network controlling apparatus. The network infrastructure is configured to communicatively couple the first number of transmitters and the second number of receivers. Each transmitter of the first number of transmitters periodically transmits a predetermined amount of data to an associated receiver of the second number of receivers. The periodical transmission is performed with an individual predetermined transmission period for each of the transmitters. A predetermined transmission path through the network infrastructure is used between each of the transmitters and the respective associated receiver.

The network controlling apparatus is adapted to configure a network. The network controlling apparatus comprises a delay calculator, a comparator and a network configurator. The delay calculator is configured to compute, for each transmission of the transmitters within a predetermined test period, a maximum amount of delay between a transmission of a data by transmitter and a reception of the data by the associated receiver. The comparator is adapted to determine, for each transmission of the transmitters within the predetermined test period, whether or not the computed amount of delay exceeds a predetermined first threshold value. The network configurator is adapted to apply the predetermined transmission path, if a number of the computed amounts of a delay which exceeds the predetermined first threshold value within the predetermined test period is equal or less than a second predetermined threshold value.

A transmission of data may be delayed if multiple data packets shall be transmitted through a network at a same point of time. In such a case the individual data packets have to be transmitted successively. Hence, the data packets which are queued may be at a later time. Such a delay of data packets may raise some issues when a control of the application is based on the received delayed data. Depending on the application, a small delay which is smaller than a predetermined threshold value may be acceptable for using the received data. However, if the delay of the received data is larger than an acceptable threshold value, such data have to be discarded.

Depending on the application, it may be acceptable to perform controlling even if the received data are discarded once or less than the predetermined number of times. However, if no reliable data are available for a longer time period, it will be not possible to perform reliable controlling, and consequently, the control system may run into instabilities or a dangerous state.

Some embodiments include analyzing a configuration of such a system in advance to determine whether or not a reliable control can be performed based on a desired data transmission concept. Only if it can be ensured that the delay and the number of discarded data packets is less than a worst-case consideration for the requirements, the respective configuration is applied. Otherwise, an alternative solution has to be searched. Accordingly, the present disclosure describes solutions for realizing a reliable periodically data transmission for controlling an application.

The transmitters may be any kind of transmitters which periodically transmit a predetermined amount of data. For example, the transmitters may comprise sensors which periodically measure a measurement value, for example a position, an angle, a speed, a temperature, a pressure, a voltage, a current, etc. However, any other measurement may be sensed, too. The sensed measurement values may be directly measured as a digital value, or an analogue measurement value may be converted to a digital value by means of an analogue to digital converter. Accordingly, the digital data corresponding to the sensed measurement may be periodically transmitted from the transmitter to an associated receiver.

Depending on the complexity of the system, any number, i.e. one or more than one, transmitters and receivers may be possible. In particular, the number of transmitters may be different from the number of receivers.

In some embodiments, multiple measurement values may be acquired at common spatial positions or at least by common hardware. In this case, the common hardware may transmit data of all acquired measurement values. For example, the data of all acquired measurement values may be combined into a common data packet and the combined data packet may be transmitted to an associate receiver. However, it may be also possible that individual data packets may be generated for individual measurements. In this case, separate data packets may be transmitted from the transmitter to one or more than one receivers. In some embodiments, it may be possible to apply different transmission intervals for different kinds of measurements. Accordingly, even though the data are transmitted by a common hardware device, the transmission of different data may be considered as a transmission of data transmitted by individual transmitters, since the transmission period and/or the associated receiver data may be different.

In some embodiments, the transmission of the data from the transmitters to the receivers may be performed by any appropriate communication network. For example, the transmission may be performed by a communication network comprising a plurality of hops, such as switches, routers, etc. Accordingly, for each communication from a transmitter to a receiver, an individual transmission path may be selected. This transmission path may specify, for instance, a route from the transmitter to the receiver via multiple hops in a predetermined order. Especially, a same transmission path is used for each transmission from a transmitter to an associated receiver. Accordingly, the transmission path from the transmitter to the receiver can be clearly specified. In particular, the output port of the transmitter, the input port of the receiver and the input/output ports of the intermediate devices are well-known.

Since the transmission path and the related hardware devices are well-known, the time for transmitting data from the transmitter to the receiver via the predetermined transmission path is also well-known. In particular, since the amount of the predetermined data which are to be transmitted from the transmitter to the associated receiver is well-known and since further related devices are also well-known, the time for transmitting the data from the transmitter to the receiver can be determined very precisely.

In some embodiments, data from a plurality of transmitters may be periodically transmitted to one or more receivers. Since each transmitter may have a different time period for periodically transmitting its data, the individual points of time for transmitting data by the respective transmitters have to be taken into account. For instance, there may be some points of time when only a single transmitter is transmitting data. However, there may be also some points of time when more than one transmitter wants to transmit data simultaneously. In particular, in such a situation at least some parts of a transmission path may be used in common. Since only a single data transmission is possible through each segment of the network, it may be necessary to postpone, i.e. queue some of the data transmission. Accordingly, the queued data transmission may be received with a delay in time.

In order to assess a worst case scenario, it may be assumed that a desired data transmission may be the last transmission in a transmission queue when postponing the data transmission. Accordingly, it may be assessed whether or not such a delayed reception of data may be still acceptable or whether the delay of the data transmission exceeds a predetermined threshold value, and thus, the received delayed data may be not taken into account anymore.

If the delayed data are not taken into account anymore and thus, the delayed data are discarded, and it has to be assessed whether such a discard of data is acceptable. For example, it may be allowable to discard data from a particular transmitter for a predetermined number of times (corresponding to a predetermine time period). Accordingly, if the received data are discarded, it has to be assessed, whether or not such a discard of data may be acceptable. If the data are discarded more than an acceptable number of times, i.e., the number of data which are delayed more than an acceptable time period, exceeds a predetermined number, a desired configuration of the system may cause some issues. Hence, such a configuration of a desired system may be not acceptable, and accordingly, an alternative configuration has to be searched.

However, if a delay of data is less than an acceptable threshold value, or at least the number of times when the data have to be discarded due to a long delay during the transmission, is less than a desired threshold, the desired configuration of the network with the transmitters and the receivers is acceptable. Hence, such a configuration can be applied to the system.

In order to assess the maximum delay of the transmitted data and the number of discarded data, the analysis of the data transmission has to be taken into account for a particular test period. This test period depends on the individual time periods for transmitting data by the number of transmitters. In particular, the test period has to be at least a period which may take into account all combinations of data transmissions by the individual transmitters.

In some embodiments, the test period is computed based on a least common multiple of the transmission periods of the number of transmitters. When considering a least common multiple of the individual transmission periods of all related transmitters, the related test period covers all combinations of data transmissions by the related transmitters. For example, the individual transmitters may transmit data based on a predetermined time grid having predetermined time intervals. In some embodiments, the time period for transmitting data may be determined by a multiple of the time intervals of the predetermined grid. In this case, the test period may be selected as a time period of the least common multiple of the time intervals of the individual transmitters. In this way, all combinations of transmitting data by the related transmitters can be considered.

In some embodiments, the maximum amount of delay is computed for each time slot, i.e. each point of time, when the transmission of data by at least two transmitters is overlapping. When only a single transmitter is transmitting data at a particular point of time, the respective data can be immediately transmitted without any delay. In particular, it is not necessary to postpone/queue a transmission of data when no additional data shall be transmitted.

However, when more than one transmitter intends to transmit data at a particular point of time, it may be necessary to queue some of the data to be transmitted. In this way, some of the data may be received by the respective receiver with a delay. Consequently, this delay has to be assessed in order to determine whether or not such a delay is acceptable for the respective system.

In some embodiments, the maximum amount of delay is computed based on a sum of the amount of data which is transmitted at a respective time slot, i.e. a respective point of time. If the amount of data is known which is to be transmitted, it is possible to compute the time which is necessary for transmitting the amount of data. In particular, when the transmission rate of the related network is known, the time for transmitting the data can be determined based on this transmission rate. If necessary, an overhead due to control data or other related data may be added to the data when determining the time for transmitting the respective data.

In some embodiments, at least one transmission path is adapted, if the number of the computed amount of delay which exceeds the predetermined first threshold within the predetermined test period is greater than a second predetermined threshold value.

Accordingly, if it is detected that the desired configuration will cause an issue due to an unacceptable delay and/or an unacceptable amount of discarded data, it will be necessary to modify the configuration in order to optimize the data transmission. Accordingly, such an optimization may be achieved by modifying at least one transmission path between a transmitter and a receiver. For instance, a transmission path may be selected which uses other hops (switches, routers, etc.). Accordingly, the load in a network can be balanced. For example, it may be possible to route some of the data via alternative hops, such that the burden of an overloaded hop can be reduced. In this way, the maximum delay in such an overloaded hop can be reduced and consequently, the respective data may be transmitted with an reduced maximum delay.

In some embodiments, a time division multiplex transmission between at least one transmitter and the associated receiver is applied, if the number of the computed amount of delay which exceeds the predetermined first threshold value within the predetermined test period is greater than a second predetermined threshold value. Time division multiplex transmission may allow a reliable well-known transmission time for transmitting data through a network. Accordingly, TDM transmission may be applied in order to avoid an unacceptable high delay or an unacceptable high amount of discarded data in the network. By limiting such a TDM transmission only to particular cases, the effort for planning and realizing such a complex and costly transmission scheme can be minimized.

In some embodiments, data from at least two transmitters are handled by a common port of a network device in the transmission path between each of the transmitters and the associated receivers. Specifying a transmission through the network usually associates the related hops, such as switches and routers, and the links, i.e. the cables between the respective hops. Accordingly, each link between two hops may be assigned to a respective port of a network device. Accordingly, when transmitting data from a plurality of transmitters through a common transmission line (cable), a common port of the respective network device may be used.

In some embodiments, the method further comprises the step of adding a further transmitter to the network. The further transmitter may be adapted to periodically transmit a predetermined amount of data to an associated receiver of the network. Accordingly, the method may be used for enhancing an already existing network. In particular, the method may analyze whether or not it is possible to add any further transmitters to an already existing network without raising any issues due to the delay of the respective data transmission. Hence, if the method comes to the conclusion that the further transmission device may be added without any issues, the enhanced configuration can be accepted. Otherwise, if an issue in the transmission delay is detected, the further transmitter may be refused, or alternatively, a reconfiguration of the transmission system will be required before adding the further transmitter.

In some embodiments, the network, in particular the network infrastructure comprises a packet switched network. Packet switched networks may be, for instance, Ethernet networks, in particular industrial Ethernet networks, or any other packet switched industrial bus network. Accordingly, a periodical reporting of data from transmitters to receivers may be applied in a simple and inexpensive manner.

Some embodiments prove a network configuration when periodically reporting data from a number of transmitters to a number of receivers. In particular, it is possible to identify issues due to a delay in the data transmission caused by a simultaneous transmission of data by multiple transmitters through the same network. By considering a threshold for a maximum allowable delay and a further threshold for a maximum number of allowable discarded data due to unacceptable highly delayed data, it is possible to identify whether or not the minimum requirements for a reliable transmission of data in a desired configuration can be achieved. In particular, it may be possible to automatically decide whether or not a desired configuration is appropriate. Hence, an inappropriate configuration may be automatically refused and otherwise, a desired configuration may be automatically be applied if the desired configuration can be proved.

FIG. 1 shows a block diagram of an example embodiment of a communication network 10. The communication network comprises a number of transmitters 1-$i$ and a number of receivers 2-$i$. Even though the number of three transmitters 1-$i$ and the number of two receivers 2-$i$ is shown in FIG. 1, it is understood that the communication network may comprise any number, i.e. one or more, of transmitters 1-$i$ and any number of receivers 2-$i$. The transmitters 1-$i$ and the receivers 2-$i$ are communicatively coupled by a network infrastructure comprising a number of hops 3-$i$. The transmitters 1-$i$, the hops 3-$i$ and the receivers 2-$i$ may be coupled by links, for example by cables, especially by optical fibers or copper cables. For example, each transmitter 1-$i$ may comprise an output port, which is coupled with a port of a hop 3-$i$ by a respective link. Furthermore, the individual hops 3-$i$ may comprise ports for connecting the individual hops 3-$i$ with each other or for connecting the hops 3-$i$ with input ports of the receivers 2-$i$. In this way, each transmitter 1-$i$ may send data through the network infrastructure to a receiver 2-$i$ through a predetermined transmission path. For example, the transmission path may be determined by specifying the related hops 3-$i$. Especially, it may be possible to specify the order for transmitting the data from a transmitter 1-$i$ through the related hops 3-$i$ to the desired receiver 2-$i$.

Each transmitter 1-$i$ may periodically send data through the network infrastructure to an associated receiver 2-$i$. The periodic time between two successive transmissions of data may be set individually for each of the transmitters 1-$i$. Accordingly, each transmitter 1-$i$ transmits data at well-known points of time based on the respective periodic time. The interval between two successive transmissions of data may depend on the desired application. For instance, the interval between two successive transmissions may be in the range of milliseconds, seconds, minutes or even longer.

In some embodiments, the transmitters 1-$i$ may be parts of an industrial application. Especially, each transmitter 1-$i$ may report status information, a measurement value, a sensed parameter, or any other kind of information. For example, it may be possible to determine an environmental parameter, a measurement value a status information, e.g. temperature, pressure, humidity, voltage, current, speed, position, angle, etc. which is determined by an acquiring device (not shown). The acquired data may be acquired in a digital form, or may be acquired as an analogue value and may be converted by an analogue to digital converter to a digital value. Accordingly, a digital value may be transmitted by a transmitter 1-$i$ through the network infrastructure to an associated receiver 2-$i$ through the network infrastructure.

The receiver 2-$i$ may receive the data sent by the transmitters 1-$i$, analyze the received data and perform a processing, especially controlling of a system based on the received data. For example, in an industrial system a plurality of sensors may acquire sensor data and the acquired sensor data may be periodically reported from the transmitters 1-$i$ through the network infrastructure to the receivers 2-$i$. Based on the received data the industrial system may be controlled. However, it is understood that the present invention is not limited to such an application of an industrial system. Moreover, it may be also possible to periodically report any kind of data from the transmitters 1-$i$ to the receivers 2-I and to perform a processing based on the received data.

In order to perform a reliable processing based on data which are received by the receivers 2-$i$, it is necessary to timely receive the periodically transmitted data. Accordingly, the receivers 2-$i$ may assess a delay between the point of time when the data are transmitted by a transmitter 1-$i$ and a point of time when the respective data are received by the receiver 2-$i$. For example, a time stamp may be included in the data when transmitting the data by a transmitter 1-$i$. Based on this time stamp, a receiver 2-$i$ may determine a delay by comparing the respective time stamp with a current system time of the receiver 2-$i$. If the determined delay is less than a maximum acceptable delay, the received data may be accepted and used for a further processing, e.g. controlling a technical system. However, if the transmitted data are delayed more than an acceptable threshold value, the received data may be discarded. If the received data are delayed more than an acceptable threshold, the received data may not represent a current state of the observed system and thus, such a data may be not used for controlling the system.

Depending on the desired application, it may be possible to perform a processing, e.g. controlling of a system, even if some data are not received or discarded due to an exceeding delay. In some embodiments, for each kind of data or for each transmitter 1-$i$ it may be specified a predetermined number of times for which it is acceptable to discard data. In some embodiments, it may be specified a maximum period of time for which it may be acceptable to perform a processing, especially a controlling of a system, without receiving valid data. Such a period of time may be denoted, for example, as "grace time".

When multiple transmitters 1-$i$ are periodically transmitting data through a common network infrastructure to one or more receivers 2-$i$, it may be possible that more than one transmitter 1-$i$ intends to transmit data at a same point of time. If more than one transmitter 1-$i$ intends to transmit data at a same point of time and the respective transmission path for transmitting the data by the multiple transmitters 1-$i$ to the associated receivers 2-$i$ at least partially uses a common network infrastructure, some of the data transmission operations have to be queued. Referring to FIG. 1, for example transmitters 1-1 and 1-2 intends to transmit data at a same point of time to the receiver 2-1. In this case, both transmitters 1-1, 1-2 use the same hops 3-1 and 3-2 and the communication links between the hops 3-1 and 3-2 as well as the link between hop 3-2 and receiver 2-1. Accordingly, the data of one transmitter 1-$i$ or 1-$ii$ have to be queued until the data of the other transmitter 1-2 or 1-1 has been transmitted. After the transmission has been completed, the queued data may be transmitted at a later point of time. Accordingly, the queued data will be received by the receiver 2-1 with an additional delay. In this case, receiver 1-2 may determine whether the additional delay is larger than an acceptable threshold for the respective data. If the delay is less than a predetermined threshold, the delayed data will be accepted. Otherwise, the delayed data will be discarded.

In case that the transmitters 1-$i$ all have a same periodic time for transmitting data, such a collision for simultaneously sending data from multiple transmitters 1-$i$ may occur each time when sending the data. However, as already mentioned above, it is not mandatory that all transmitters 1-$i$ have a same periodic time for periodically transmitting data. Especially when the periodic time for periodically transmitting the data of the transmitters 1-$i$ are different, there may be some cases when only one or only some of the transmitters 1-$i$ intend to transmit data, but there may be also some points of time when multiple or even all transmitters 1-$i$ intend to transmit data at a same point of time. Accordingly, it will be necessary to analyze the transmission scheme in order to detect whether or not a delay due to a simultaneous transmission of data from a plurality of transmitters may cause some problems in the communication network 10.

In some embodiments, when designing a new system or adding a further transmitter 1-$i$ to an existing system, or modifying the network infrastructure, it will be necessary to assess whether or not the requirements with respect to a maximum delay of periodically transmitted data can be fulfilled. For example, a network controlling apparatus 4 may be established which analyses a desired configuration. The network controlling apparatus 4 may consider the periodic times for periodically transmitting data from the transmitters 1-$i$ through the network infrastructure to the receivers 2-$i$ based on predetermined transmission path. The network controlling apparatus 4 may be employed as a separate device or as a device which is included in the network infrastructure. It is understood, that any kind of configuration for employing the network controlling apparatus 4 may be possible, too.

Figure 2:
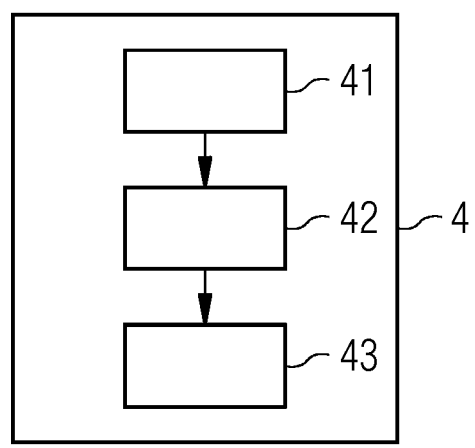
FIG. 2 shows a block diagram of an embodiment of a network controlling apparatus incorporating teachings of the present disclosure.

FIG. 2 shows a block diagram of an example embodiment of a network controlling apparatus 4 incorporating teachings of the present disclosure. The network controlling apparatus 4 may comprise hardware elements, like e.g. a processing unit. However, the network controlling apparatus 4 may also be software implemented at least in part. For example, instructions may therefore be stored in a memory that is coupled to a general purpose processor, e.g. via a memory bus. The processor may further execute an operating system that loads and executes the instructions. The processor may for example be an Intel processor executing an operating system like a Windows or Linux operating system that loads and executes the instructions. In some embodiments, the processor may be a processor of a device that runs e.g. an embedded operating system that loads and executes the instructions.

In some embodiments, the network controlling apparatus 4 may comprise a delay calculator 41, a comparator 42, and a network configurator 43. The delay calculator 41 may compute for each transmission of the transmitters 1-$i$ within a predetermined test period a maximum amount of delay between the point of time when data are transmitted by a transmitter 1-$i$ and a point of time when the respective data are received by the associated receiver 2-$i$. This delay may be computed based on theoretical assumptions such as the transmission rate of the network infrastructure in conjunction with the amount of data which is to be transmitted.

In some embodiments, additional delays caused by the processing of the data in the individual hops in a transmission path between the transmitter 1-$i$ and the receiver 2-$i$ may be also taken into account. Furthermore, when computing the maximum delay for a transmission from a transmitter 1-$i$ to a receiver 2-$i$, it may be also taken into account an additional delay due to a simultaneous transmission of data by a plurality of transmitters. As already explained above, if more than one transmitter 1-$i$ intends to transmit data at a same point of time, the data of only a single transmitter may be immediately transmitted, and the data of the other transmitters 1-$i$ have to be queued. In some embodiments, the data of the respective transmitters 1-$i$ are transmitted successively.

In this case, it may be assumed that the data to be considered are scheduled as the last data which are transmitted when queuing the data from a plurality of transmitters which are to be transmitted simultaneously. In particular, such a consideration of a delay of queued data has to be taken into account for each related hop 3-1 in the transmission path of the network infrastructure. As a result of this assessment, a worst case assumption for the maximum delay of the data to be transmitted is obtained. This maximum delay has to be determined for each transmission of data within a predetermined test period. The determination of the related test period will be explained in more detail below.

Based on the determined maximum delay of the transmitted data, it may be further determined whether or not the maximum delay exceeds a predetermined threshold value. This predetermined threshold value specifies a time limit for a maximum acceptable delay of the data during the transmission. If the data are delayed more than the predetermined threshold value, the respective data will be discarded and not taken into account for a further processing. Otherwise, if the delay of the transmitted data is less than the predetermined threshold value, the received data will be accepted, and used for a further processing. For this purpose, the comparator 42 may determined whether or not the computed maximum amount of delay exceeds the predetermined threshold value. This determination is performed for each transmission of data by each of the transmitter within the predetermined test period.

In some embodiments, it is determined how many times the data are discarded due to a delay which exceeds the predetermined threshold value. In particular, for each transmitter 1-$i$ it is determined how many transmissions of data are discarded due to an exceeding delay within the considered test period. If this number of discarded data transmission exceeds a further threshold (corresponding to the grace time), it is assumed that no reliable processing based on the remaining received data can be performed.

Otherwise, if the number of discarded data due to an exceeding delay is less than the further threshold, it is assumed that a reliable processing based on the received data can be performed.

In the latter case, the desired configuration of the network infrastructure with the transmission scheme for periodically transmitting data from the transmitters 1-$i$ to the associated receivers 2-$i$ can be applied. In particular, a network configurator 43 may apply the desired configuration, if the above-mentioned condition is fulfilled, namely that the number of discarded data transmissions is less than a required threshold value. Otherwise, an alternative configuration has to be computed and tested as described above. For this purpose, at least some of the predetermined transmission paths between the transmitters 1-$i$ and the associated receivers 2-$i$ may be changed. Furthermore, it may be also possible to modify the periodic times for periodically transmitting the data, connecting at least some of the transmitters to other hops 3-$i$ or other ports of a hop 3-$i$, or to perform other modifications of a desired configuration. After modifying the configuration, the newly determined configuration may be tested as described above.

If a tested configuration fulfills the above-mentioned requirements, the data transmission for the transmitters 1-$i$ to the receivers 2-$i$ can be performed based on a queued transmission of data through the network infrastructure. However, if no appropriate solution for the data transmission can be found based on the queued transmission of data, at least some of the data may be transmitted based on a time division multiplex transmission (TDM transmission), which ensures a timely transmission of data from a transmitter to a receiver.

Figure 3:
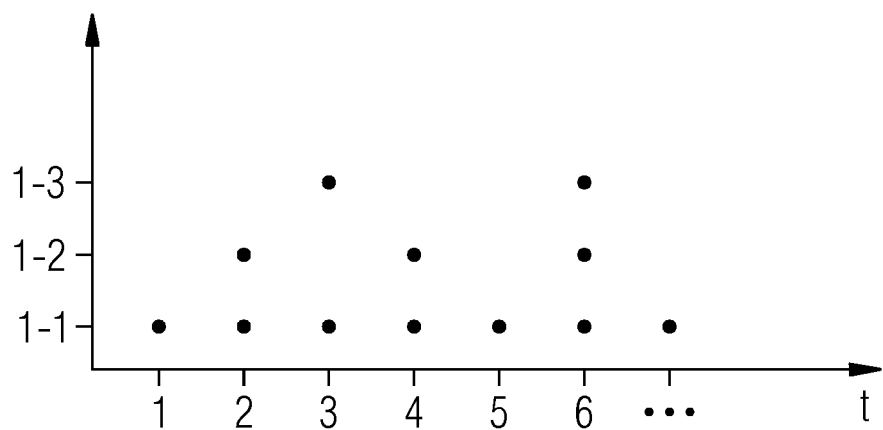
FIG. 3 shows a diagram illustrating a periodic transmission by a number of transmitters.

FIG. 3 schematically illustrates a transmission scheme for periodically transmitting data by three transmitters 1-*i*, 2-*i*, 3-*i*. As already mentioned above, it is understood that the teachings of the present disclosure are not limited to a number of three transmitters. Moreover, any other number of transmitters may be applied, too. Furthermore, the teachings of the present disclosure are not limited to the transmission scheme as illustrated in FIG. 3. Any other transmission scheme, in particular any other intervals for periodically transmitting data may be also possible.

As can be seen in FIG. 3, a first transmitter 1-*i* may periodically transmit data with a first time period. In this case, the first transmitter 1-*i* transmits data at the point of times 1, 2, 3, 4, 5, 6 . . . . A second transmitter 1-2 transmits data with a different periodic time. In this case, the periodic time of the second transmitter 1-2 is twice the periodic time of the first transmitter 1-1. Furthermore, a third transmitter 1-3 periodically transmits data with a third periodic time. In this case, the third periodic time is three times the periodic time of the first transmitter 1-*i*. Accordingly, at a first point of time 1, only the first transmitter transmits data. At a second point of time 2, the first transmitter 1-1 and the second transmitter 1-2 intends to transmit data simultaneously. Hence, the data of one transmitter (e.g. 1-2) are queued until the data of the other transmitter (e.g. 1-1) are transmitted. At a third point of time 3, the first transmitter 1-1 and the third transmitter 1-3 intends to transmit data simultaneously.

Accordingly, the data of one transmitter (e.g. 1-3) are queued until the data of the other transmitter (e.g. 1-1) are successfully transmitted. As can be further seen in this FIG. 3, at a sixth point of time 6, all three transmitters 1-1, 1-2 and 1-3 intend to transmit data simultaneously. Hence, the data of two transmitters (e.g. 1-2, 1-3) have to be queued. Accordingly, only the data of one transmitter (e.g. 1-1) may be sent immediately, while the remaining data of the other two transmitters (e.g. 1-2, 1-3) have to be queued. After the first data have been successfully transmitted, the data of one of the other transmitters (e.g. 1-2) may be sent, but the remaining data are still queued. Accordingly, for this point of time 6, a maximum delay may be computed by considering that the related data are the last data to be transmitted through the common network infrastructure. In this way, worst case assumption may be taken into account all possible permutations of the queuing.

As can be seen in this FIG. 3, the transmission pattern will repeat after each sixth point of time. Hence, a minimum test period for considering all possible delays may assess at least such a time period. This time period may be computed by a least common multiple of all related periodic times. In this example, the first transmitter 1-1 has a period of time of 1, the second transmitter 1-2 has a period of time of 2 and the third transmitter 1-3 has a periodic time of 3. Accordingly, the least common multiple of one, two and three is six, and consequently, the test period for considering the maximum delays may be considered as the least common multiple of one, two, and three, i.e. six.

As mentioned above, it is possible to identify whether or not some of the data which are transmitted from a transmitter 1-*i* to a receiver 2-*i* via a network infrastructure may be received with a delay which exceeds a maximum acceptable delay. As also mentioned above, the data will be discarded if the delay exceeds a maximum acceptable threshold. In this case, it may be even possible to apply a transmission scheme which prevents the transmission of data which will cause a delay. Hence, by preventing a transmission of data which will be received with a delay larger than a predetermined acceptable threshold or data causing a delay of other data which shall be transmitted at a same time, the load of the network can be further reduced.

Accordingly, it may be possible to drop a transmission of particular data in order to enable a timely reception of other data. For example, if it determined that the data from a particular transmitter 1-*i* to an associated receiver 2-*i* will be received with an exceeding delay due to a transmission of data by another transmitter 1-*i*, the transmission of the other transmitter 1-*i* may be suspended in order to enable a timely reception of the data which will be received delayed otherwise.

Figure 4:
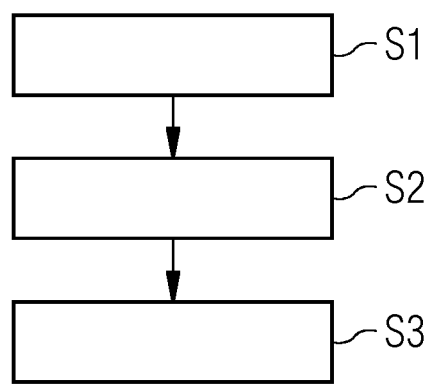
FIG. 4 shows a flow diagram of an embodiment of a method incorporating teachings of the present disclosure.

FIG. 4 illustrates a flow diagram of a method for configuring a network. For the sake of clarity, in the following description of the method based on FIG. 4 reference signs used above in the description will be maintained. In some embodiments, a method for configuring a network may be applied to a communication network 10 as already explained above. Accordingly, the operations of the above described elements will be applied to the method as described in the following. Accordingly, all steps of the method for configuring a network as described in the following will also be applied to the network controller 4 as described before.

An example method for configuring a network 10 may be applied to a network comprising a first number of transmitters 1-*i* and a second number of receivers 2-*i*. Each transmitter 1-*i* periodically transmits a predetermined amount of data to associated receiver 2-*i*. The periodical transmission is performed with an individual predetermined transmission period for each of the transmitters 1-*i*. Furthermore, a predetermined transmission path is used between each of the transmitters 1-*i* and the associated receiver 2-*i*. The method comprises a step S1 of computing a maximum amount of delay between a transmission of data by a transmitter 1-*i* in the reception of the data by the associated receiver 2-*i*. The computing S1 is performed for each transmission of the transmitters 1-*i* within a predetermined test period.

In some embodiments, the method further comprises a step S2 for determining whether or not the computed amount of delay exceeds a predetermined first threshold value. This determination is performed for each transmission of the transmitters 1-*i* as in the predetermined test period. Further, the method comprises a step S3 of applying the predetermined transmission path, if a number of the computed amounts of delay which exceeds the predetermined first threshold value within the predetermined test period is at least equal or less than a second predetermined threshold value. The test period may be computed based on a least common multiple of the transmission periods of the transmitters 1-*i*.

The maximum amount of delay may be computed for each time slot, i.e. each point of time, when the transmission of data by at least two transmitters 1-*i* is overlapping. The maximum amount of delay may be computed based on a sum of the amount of the data transmitted at the respective time slot.

In some embodiments, the method may further comprise a step of adapting at least one transmission path, if the number of the computed amounts of delay which exceeds the predetermined first threshold value within the predetermined test period is greater than a second predetermined threshold value.

In some embodiments, the method may further comprise the step of applying a time division multiplex transmission between at least one transmitter 1-$i$ and the associated receiver 2-$i$ if the number of the computed amounts of delay which exceeds the predetermined first threshold value within the predetermined test period is greater than a second predetermined threshold value. Data from at least two receivers may be handled by a common port of a network device 3-$i$ in the transmission path between each of the transmitters 1-$i$ and the associated receivers 2-$i$.

In some embodiments, the method may further comprise a step of adding a further transmitter 1-$i$ to the network. The further transmitter 1-$i$ may be adapted to periodically transmit a predetermined amount of data to an associated receiver 2-$i$ of the network. In some embodiments, the network 10 may comprise a network infrastructure comprising packet switched network, for instance an Ethernet such as an industrial Ethernet or an industrial bus system.

In some embodiments, the teachings of the present disclosure provide a communication network wherein a plurality of transmitters periodically transmit data to a number of receivers. The data may be transmitted by a queued transmission scheme. In order to assess the reliability of the communication network, a worst case assumption for a delay of a queued transmission is performed. Data may be discarded if a delayed queued transmission exceeds a predetermined maximum. The network may be considered to be acceptable, if the number of discarded data due to an exceeding delay is less than a further threshold.

What is claimed is:

1. A method for configuring a network comprising a plurality of transmitters and a plurality of receivers, wherein each transmitter periodically transmits a predetermined amount of data to an associated receiver, the periodical transmission having a respective individual predetermined transmission period for each transmitters, and a predetermined transmission path between each respective transmitter and the associated receiver, the method comprising:
computing, for each transmission within a predetermined test period, a maximum amount of delay between a transmission of data by a transmitter and a reception of the data by the associated receiver;
determining, for each transmission within the predetermined test period, whether the computed amount of delay exceeds a predetermined first threshold value; and
using the predetermined transmission path only if a number of the computed amounts of delay which exceeds the predetermined first threshold value within the predetermined test period is equal or less than a second predetermined threshold value.

2. The method according to claim 1, wherein determining the test period includes calculating a least common multiple of the transmission periods of the plurality of transmitters.

3. The method according to claim 1, further comprising calculating the maximum amount of delay for each time slot when the transmission of data by at least two of the plurality of transmitters is overlapping.

4. The method according to claim 1, further comprising calculating the maximum amount of delay based on a sum of the amount of data transmitted at the respective time slot.

5. The method according to claim 1, further comprising changing a transmission path if the number of the computed amounts of delay which exceeds the predetermined first threshold value within the predetermined test period is greater than the second predetermined threshold value.

6. The method according to claim 1, further comprising applying a time division multiplex transmission between one transmitter of the plurality of transmitters and the associated receiver if the number of the computed amounts of delay which exceeds the predetermined first threshold value within the predetermined test period is greater than the second predetermined threshold value.

7. The method according to claim 1, wherein data from at least two transmitters are handled by a common port of a network device in the respective transmission paths between each of the transmitters and the associated receivers.

8. The method according to claim 1, further comprising adding a further transmitter to the network;
wherein the further transmitter periodically transmits a predetermined amount of data to at least one receiver of the plurality of receivers.

9. A network controlling apparatus for configuring a network including a plurality of transmitters and a plurality of receivers, wherein each transmitter periodically transmits a predetermined amount of data to an associated receiver, each periodical transmission with an individual predetermined transmission period, and a predetermined transmission path between each of the transmitters and the associated receiver, the apparatus comprising:
a delay calculator computing, for each transmission within a predetermined test period, a maximum amount of delay between transmission of data by a given transmitter and reception of the data by the associated receiver;
a comparator determining, for each transmission within the predetermined test period, whether the computed amount of delay exceeds a predetermined first threshold value; and
a network configurator using the predetermined transmission path if a number of the computed amounts of delay which exceeds the predetermined first threshold value within the predetermined test period is equal or less than a second predetermined threshold value.

10. The apparatus according to claim 9, wherein the delay calculator computes the test period based on a least common multiple of the respective transmission periods of the plurality of transmitters.

11. The apparatus according to claim 9, wherein the network configurator applies a time division multiplex transmission between at least one transmitter and the associated receiver if the number of the computed amounts of delay which exceeds the predetermined first threshold value within the predetermined test period is greater than the second predetermined threshold value.

12. The apparatus according to claim 9, wherein data from at least two transmitters are handled by a common port of a network device in the respective transmission paths between the at least two transmitters and the associated receivers.

13. The apparatus according to claim 9, wherein the network configurator adds a further transmitter to the network, the further transmitter periodically transmitting a predetermined amount of data to an associated receiver of the plurality of receivers.

14. A communication network comprising:
a plurality of transmitters;
a plurality of receivers;
a network infrastructure adapted to communicatively couple individual transmitters and to individual receivers;
wherein each transmitter periodically transmits a predetermined amount of data to an associated receiver;

each respective periodical transmission has an individual predetermined transmission period and a predetermined transmission path through the network infrastructure between each of the transmitters and the associated receiver; and a network controlling apparatus including:
- a delay calculator computing, for each transmission within a predetermined test period, a maximum amount of delay between transmission of data by a given transmitter and reception of the data by the associated receiver;
- a comparator determining, for each transmission within the predetermined test period, whether the computed amount of delay exceeds a predetermined first threshold value; and
- a network configurator using the predetermined transmission path if a number of the computed amounts of delay which exceeds the predetermined first threshold value within the predetermined test period is equal or less than a second predetermined threshold value.

15. The network according claim 14, wherein the network infrastructure comprises packet switched network.

* * * * *